US 7,707,186 B2

(12) United States Patent
LeCrone et al.

(10) Patent No.: US 7,707,186 B2
(45) Date of Patent: *Apr. 27, 2010

(54) METHOD AND APPARATUS FOR DATA SET MIGRATION

(75) Inventors: Douglas E. LeCrone, Hopkinton, MA (US); Paul A. Linstead, Shrewsbury, MA (US); Denis J. Burt, Oak Bluffs, MA (US)

(73) Assignee: EMC Corporation, Hopkinton, MA (US)

( * ) Notice: Subject to any disclaimer, the term of this patent is extended or adjusted under 35 U.S.C. 154(b) by 613 days.

This patent is subject to a terminal disclaimer.

(21) Appl. No.: 10/872,074

(22) Filed: Jun. 18, 2004

(65) Prior Publication Data

US 2005/0283564 A1    Dec. 22, 2005

(51) Int. Cl.
*G06F 7/00*       (2006.01)
(52) U.S. Cl. ..................... 707/656; 707/659
(58) Field of Classification Search ............... 707/1–10, 707/100–104.1, 200–204, 656, 659; 711/161, 711/162; 709/245, 203, 217; 712/220
See application file for complete search history.

(56) References Cited

U.S. PATENT DOCUMENTS

| | | | |
|---|---|---|---|
| 5,379,398 A * | 1/1995 | Cohn et al. ................ 711/154 |
| 5,440,730 A | 8/1995 | Elmasri et al. | |
| 5,542,065 A * | 7/1996 | Burkes et al. ............... 711/114 |
| 5,574,851 A | 11/1996 | Rathunde | |
| 5,875,457 A | 2/1999 | Shalit | |
| 5,875,481 A | 2/1999 | Ashton et al. | |
| 6,145,066 A | 11/2000 | Atkin | |
| 6,173,377 B1 | 1/2001 | Yanai et al. | |
| 6,199,146 B1 * | 3/2001 | Pence ......................... 711/154 |
| 6,240,494 B1 | 5/2001 | Nagasawa et al. | |
| 6,243,715 B1 | 6/2001 | Bogantz et al. | |
| 6,282,619 B1 | 8/2001 | Islam et al. | |
| 6,356,977 B2 | 3/2002 | Ofek et al. | |
| 6,366,988 B1 | 4/2002 | Skiba et al. | |
| 6,405,284 B1 * | 6/2002 | Bridge ........................ 711/114 |
| 6,405,294 B1 * | 6/2002 | Hayter ........................ 711/162 |
| 6,493,796 B1 * | 12/2002 | Arnon et al. ................ 711/114 |
| 6,598,134 B2 | 7/2003 | Ofek et al. | |
| 6,654,862 B2 * | 11/2003 | Morris ........................ 711/162 |
| 6,804,719 B1 * | 10/2004 | Cabrera et al. ............. 709/226 |
| 6,959,373 B2 * | 10/2005 | Testardi ...................... 711/203 |
| 7,146,475 B2 * | 12/2006 | Perego ........................ 711/162 |
| 7,284,017 B2 * | 10/2007 | Baune ......................... 707/200 |

(Continued)

*Primary Examiner*—Miranda Le
(74) *Attorney, Agent, or Firm*—George A. Herbster

(57) ABSTRACT

A method and apparatus for migrating one or more data sets each having one or more extents from one or more source logical devices to one or more target logical devices concurrently with interaction between the application and the data being migrated. A background operation copies each extent from the source logical device to the target logical device in a copy state. When a certain level of data has been copied, the extent is locked to assure synchronization of the data in the target logical device to the corresponding data in the source logical device. The status is changed to a mirrored state. When the extents for a data set in a source logical device or in a group of data sets have been mirrored, all the extents are changed to a diverted state. I/O requests to the diverted extents thereafter are intercepted and processed according to whether they access an extent that is in the copy, mirrored, or diverted state.

24 Claims, 13 Drawing Sheets

U.S. PATENT DOCUMENTS

| | | | |
|---|---|---|---|
| 2001/0056438 A1* | 12/2001 | Ito | 707/204 |
| 2002/0087812 A1* | 7/2002 | Pai | 711/148 |
| 2003/0065898 A1 | 4/2003 | Flamma et al. | |
| 2003/0068097 A1* | 4/2003 | Wilson et al. | 382/276 |
| 2003/0237019 A1* | 12/2003 | Kleiman et al. | 714/6 |
| 2004/0111726 A1* | 6/2004 | Dilley et al. | 719/310 |
| 2004/0250034 A1* | 12/2004 | Yagawa et al. | 711/162 |
| 2005/0149575 A1* | 7/2005 | Baune | 707/200 |
| 2005/0165817 A1* | 7/2005 | O'Conor | 707/101 |
| 2005/0210320 A1* | 9/2005 | Vincent | 714/11 |
| 2005/0251633 A1* | 11/2005 | Micka et al. | 711/162 |
| 2005/0256972 A1* | 11/2005 | Cochran et al. | 709/245 |
| 2005/0268054 A1* | 12/2005 | Werner et al. | 711/162 |
| 2005/0278492 A1* | 12/2005 | Stakutis et al. | 711/161 |
| 2006/0036648 A1* | 2/2006 | Frey et al. | 707/200 |

* cited by examiner

METHOD AND APPARATUS FOR DATA SET MIGRATION

CROSS-REFERENCE TO RELATED APPLICATION

Reference is made to U.S. patent application Ser. No. 10/283,976 filed Oct. 30, 2002, now U.S. Pat. No. 6,954,835 issued Oct. 11, 2005 for Intercepting Control of a Host I/O Process, which application is assigned to the same assignee as the present application.

BACKGROUND OF THE INVENTION

1. Field of the Invention

This invention generally relates to data storage facilities and more specifically to the migration of data within a data storage facility or between multiple data storage facilities.

2. Description of Related Art

A data storage facility generally comprises a disk array storage device that includes physical storage media and related controls. For example, a typical disk array storage device includes a plurality of physical disk drives as physical storage media. The controls include a cache memory, an interconnecting bus and adapters. At least one host adapter connects between a host processor, or "host" and the bus. A plurality of disk adapters act as interfaces between the bus and the physical disk drives.

From the perspective of applications being processed by a host, disk storage typically is organized into "logical devices". Such "logical devices" are also known as "logical storage devices", "logical volumes" and "devices". The following discussion uses "logical device." Each logical device may reside in part of, or in the entirety of, a single physical disk drive. A logical device also may reside on multiple physical disk drives. Logical devices may store one or more "data sets", also called files. Each data set comprises one or more extents. An extent is defined by one or more contiguous storage locations, typically contiguous cylinders or tracks in a disk storage system. A plurality of data sets may be designated as a "group."

An operating system provides control routines and data structures to interface a host application with a data storage facility. I/O requests from a host application generally define an operation, like a "read" or "write" operation, and logical device addresses for logical storage locations from which or to which the data is to be retrieved (read) or sent (written) respectively.

IBM-based systems, for example, use an MVS (registered trademark of IBM Corporation) operating system that includes access methods, a unit control block (UCB) and related structures that are assigned to each logical device. Operating system I/O control routines use these unit control blocks to convert the logical device addresses provided by the application into connection-based addressing recognized by the storage facility. Metadata, such as that in the volume table of contents (VTOC), provides the exact cylinder and head ranges occupied by multiple extents on that logical device assigned to a particular data set. Although a single extent occupies contiguous storage locations in a single logical device, such operating systems may scatter the individual extents in a data set across a number of logical devices.

As the quantity of stored data grows, the quantity of data in existing data storage facilities approaches a maximum capacity. Additions to that capacity often involve the addition of newer data storage facilities have greater capacities and improved performance. Consequently, it has become desirable to replace or supplement existing data storage facilities with the addition of newer data storage facilities. Benefiting from the resulting improved performance often requires a transfer of data from the older data storage facilities to the newer data storage facility or facilities.

There also is a long term trend for increasing the storage capacity of individual logical devices within new storage facilities. One reason for this is that there is an architectural limit to the number of unit control block addresses within current operating systems. This prevents a free proliferation of UCB's to support expanded storage. This situation is further exacerbated by certain throughput optimization strategies that require the dedication of multiple UCB's to the addressing of a single logical device. For example, systems now available provide overlapped access using multiple unit control blocks for addressing a single logical device. U.S. Pat. No. 6,665,739 to Vishlitzky et al. discloses an enhancement whereby provisions made for overlapped input/output requests to a single logical device by using parallel access unit control blocks. Each assignment of a parallel access unit control block to one application reduces the number of unit control blocks available for other purposes.

These and other enhancements and changes in policy have heightened the need to conserve the number of unit control blocks when possible. One conservation approach is to consolidate data from multiple small logical devices into one large logical device. Such approaches require that data be transferred from existing logical devices to one logical device in the same or different data storage facility. However, it is also an objective, if not a necessity, that such transfers occur transparently without interrupting normal data processing activities with the data being transferred or migrated.

A number of efforts have been undertaken to provide such transparent and concurrent transfers or migrations. For example, U.S. Pat. No. 6,145,066 to Atkin discloses a method for the transparent migration of data between complete logical devices. In accordance with the disclosure in this patent, data in a source logical device is transferred to a target logical device in a multi-phase process. Basically a copy sub-task completes one pass of the source logical device by copying data to the target logical device. During each task, user applications continue to interact with the data in the source logical device. After the copy sub-task completes one pass, a refresh phase analyzes the changes that were made to the source logical device and copies the changed data to the target logical device. This refresh phase continues in an iterative fashion until the number of changes is below a predetermined threshold. Then the system quiesces I/O requests to the source logical device to prevent any further interaction between the user applications and that logical device. During quiescence, the remaining changed data transfers to the target logical device. A swapping operation then makes the target logical device become a new source logical device. That is, after the swapping operation is complete, communications with user applications are re-enabled and the quiescent state is terminated to allow interaction between user applications and the data in the target, now new source.

As described, such data migrations are limited to all the data in a logical device. The new logical device may have a greater capacity than the source logical device, but the data from the source logical device is transferred essentially intact and in order to the target logical device. The system does not provide any suggestion for handling data in extents within a logical device or for combining data extents from different logical devices within one logical device.

U.S. Pat. No. 6,356,977 to Ofek et al. and assigned to the assignee of this invention discloses a system and method for on-line, real time data migration. In accordance with this patent, a replacement data storage facility connects between an existing data storage facility and a host operating system or network. The replacement data storage facility processes all I/O requests for all logical devices designated to be migrated. A background copy operation moves data from the designated logical devices in the existing data storage facility to corresponding logical devices in the replacement data storage facility. Any I/O request to a location for which data has not yet been migrated by the background operation is handled on a priority basis and status is updated to indicate that a migration has occurred with respect to that particular location. This system essentially minimizes any need to quiesce the logical devices being migrated. However, it also is limited to the migration of complete logical devices.

The foregoing Atkin and Ofek et al. patents are examples of data migration systems that transfer entire logical devices. They are not adapted for migrating one or more data sets from one or more source logical devices onto a single target logical device or multiple target logical devices on an extent-by-extent basis. They cannot reduce the number of unit control blocks that must be assigned to a given number of logical volumes in a disk array storage device, particularly when some extents in a logical device are being migrated and other extents are not.

SUMMARY

Therefore it is an object of this invention to provide a method and apparatus for migrating one or more data extents spanning less than a logical device from one logical device to another logical device.

Another object of this invention is to provide a method and apparatus for migrating multiple data extents from multiple source logical devices to one or more target logical devices.

Still another object of this invention is to provide a method and apparatus for migrating data extents transparently to operations between user applications and the data extents being migrated.

Yet still another object of this invention is to provide a method and apparatus for migrating data by dynamically replicating data extents to consolidate multiple logical devices.

Still yet another object of this invention is to provide a method and apparatus for data migration by dynamically replicating data extents from only portions of a logical device.

In accordance with this invention, a data migration process for data set extents in a source logical device is effected by generating control data structures that identify and store the existing and future locations of data extents in source and target logical devices, respectively. Each data set extent in the source logical device is copied to produce a mirrored extent in the target logical device. During this state requests to write data to the source logical device are directed to both the source and target logical devices. When all the data set extents in a source logical device have been mirrored, all corresponding metadata is updated to establish a state whereby data requests to the identified extents are diverted to corresponding locations in the target logical device or devices.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
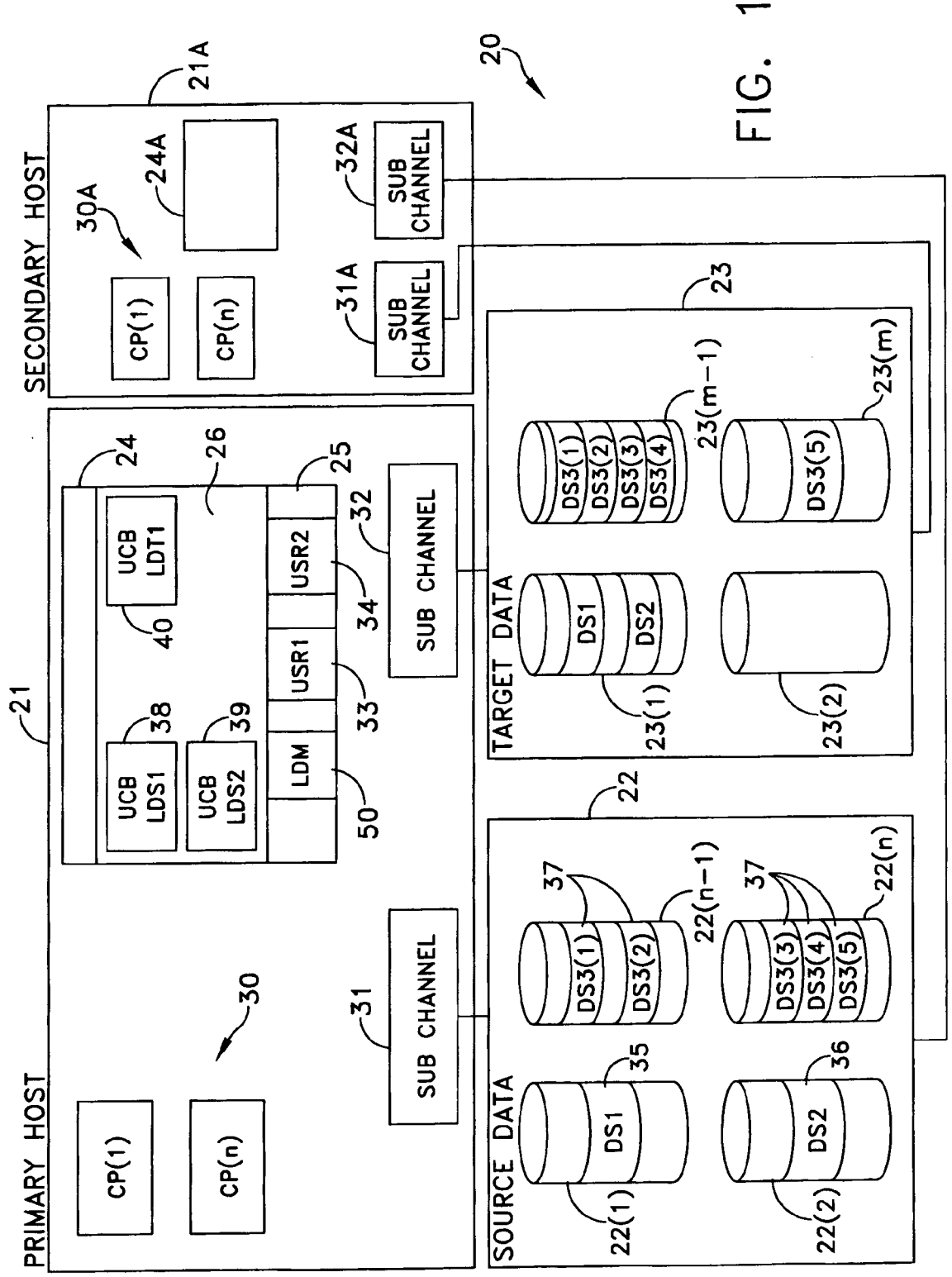
FIG. 1 is a block diagram of a multiple host data processing system that can benefit from this invention and that includes multiple data storage facilities.

FIG. 1 depicts, as an example, a data processing system 20 that includes a host 21 and two disk array storage devices as data storage facilities 22 and 23. As known in the art, the host 21 includes a main memory 24 divided into at least one private area 25 and a common storage area 26. One or more processors 30 interact with the memory 24.

Communications between the single host 21 and input-output devices, such as the data storage facilities 22 and 23, occur through sub-channels. For purposes of explaining this invention, a sub-channel 31 interfaces the host 21 and the source data storage facility 22; a sub-channel 32, the target data storage facility 23. The secondary host 21A has a similar construction with multiple processors 30A, a memory 24A and sub-channels 31A and 32A.

As previously described, a host application and a data storage facility identify the location of data differently. That is, host applications view data at a logical level as data extents or "extents" and/or data sets of one or more extents. The operating system, such as the MVS operating system, converts the host addressing format for the data into an addressing format for the data storage facility.

More specifically, the operating system uses an access method as an interface between the host application and low level routines, like the EXCP, media manager and I/O device routines. The I/O driver routines call low level functions, such as a STARTIO function to initiate I/O through a subchannel thereby to pass information to and from the data storage facility. The operating system uses information from an integrated catalog facility (ICF) that contains, among other things, the Catalog, VTOC, VVDS and other components well known in the art, to translate a data address from the addressing format received from an application into the addressing format that identifies the data by a logical device, cylinder and head. This information is generally called "metadata". The data storage facility includes information for changing this logical device addressing format to the physical disk drive addressing format.

For purposes of understanding this invention, assume that the data storage facility 22 in FIG. 1 is an existing, or source, data storage facility and that the data storage facility 23 is either a new or a preexisting data storage facility that is to act as a target to receive data from the source data storage facility 22. The data storage facility 22 has "n" logical devices with logical devices 22(1), 22(2), 22(n−1) and 22(n) being shown in FIG. 1. The data storage facility 23 has "m" logical devices with logical devices 23(1), 23(2), 23(m−1) and 23(m) being shown. In the following discussion the logical devices in the data storage facility 22 are called "source logical devices"; the logical devices in the data storage facility 23, "target logical devices."

The host 21 in FIG. 1 represents a typical mainframe system with multiple processing units controlled by an operating system, such as an IBM mainframe system operating with the IBM MVS operating system. In such a host, user applications provide the control for manipulating useful data. A USR1 application 33 and a USR2 application 34 represent two such user applications. For example, the USR1 application 33 might handle transaction processing; the USR2 application 34 might generate reports based upon the data supplied through the USR1 application 33. Often applications such as the USR1 application 33 must be available 24 hours per day, 7 days a week. Report applications may run periodically.

As known, extents forming a data set may be stored in any number of ways. That is, extents in one data set may be contiguous or non-contiguous. For example, assume that the USR1 application 33 and USR2 application 34 interact with three separate data sets designated as a DS1 data set 35, a DS2 data set 36 and a DS3 data set 37 in the source data storage facility 22. For purposes of explanation, assume that all the extents in the DS1 and DS2 data sets 35 and 36 are contiguous and that each data set resides in one logical device. Assume that the DS3 data set 37 has five extents with two extents, DS3(1) and DS3(2) residing non-contiguously on source logical device 22(n−1), while extents DS(3), DS(4) and DS(5) reside contiguously on source logical device 22(n).

This invention has the capability of migrating data sets with contiguous extents, non-contiguous extents or a combination thereof. With reference to the specific embodiment of FIG. 1, this invention has the capability of migrating each of the disclosed data sets from the source logical devices 22(1), 22(2), 22(n−1) and 22(n) to target logical devices in the data storage facility 23 without interrupting any interaction between the user applications 33 and 34 and the data in the DS1, DS2 and DS3 data sets 35, 36 and 37. For example, both the DS1 and DS2 data sets 35 and 36 can migrate to one logical device, such as the target logical device 23(1). FIG. 1 also depicts an operation by which four extents of the DS3 data set 37 migrate to contiguous locations in the target logical device 23(m−1) while the fifth extent DS3(5) migrates to the target logical device 23(m).

The memory 24 in FIG. 1 contains a Unit Control Block (UCB) for each of the logical devices in both the data storage facilities 22 and 23. These unit control blocks are stored in the common area 26 of the memory 24. FIG. 1, by way of example, depicts a UCB LDS1 control block 38 associated with the source logical device 22(1) that contains the DS1 data set 35. A UCB LDS2 unit control block 39 is associated with the source logical device 22(2). A UCB LDT1 unit control block 40 is associated with the target logical device 23(1). Other unit control blocks, not shown, are associated with each of the other logical devices shown in FIG. 1.

Figure 2:
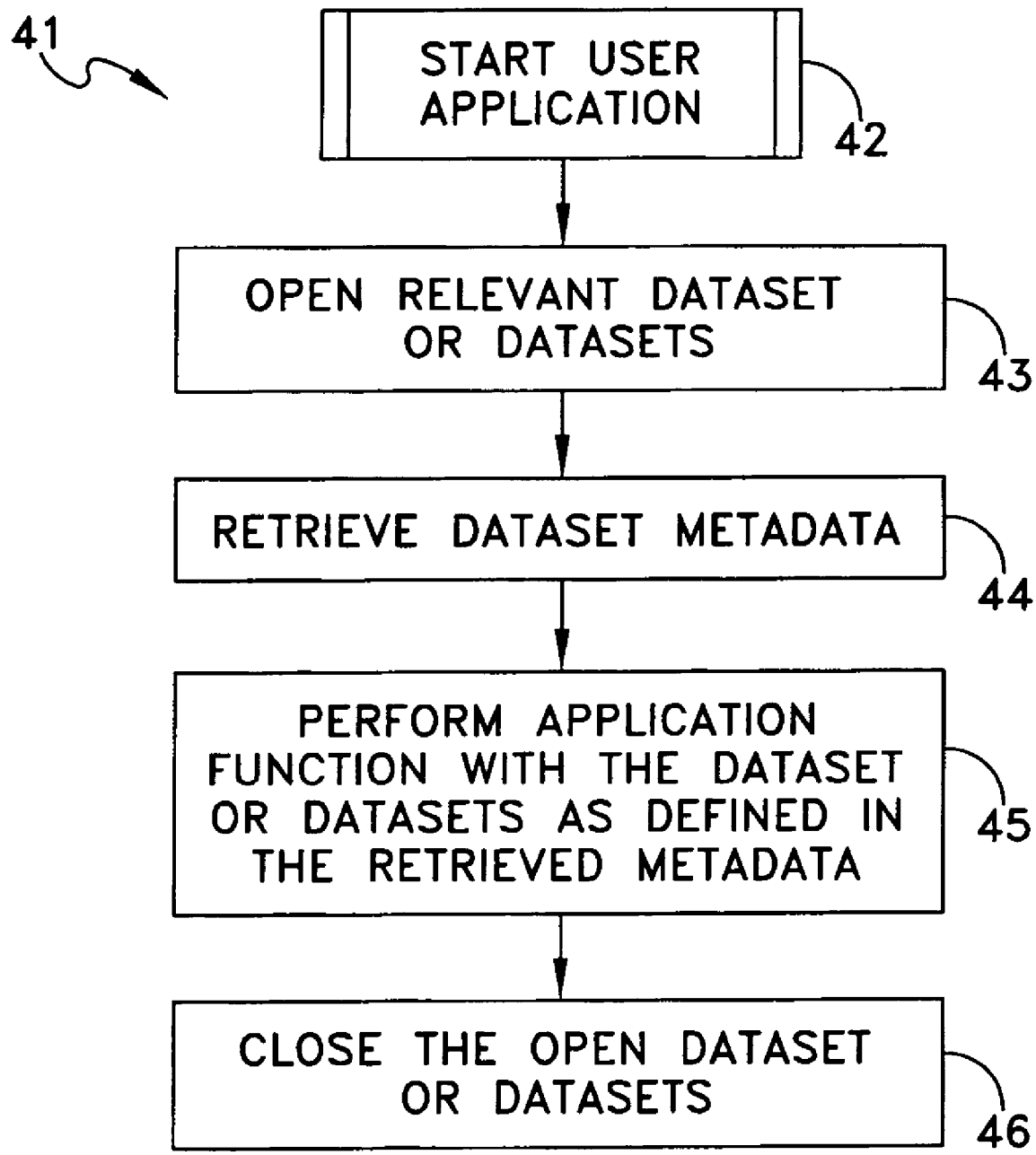
FIG. 2 is a flow chart that depicts a typical prior art interaction between an application and a data set.

Before describing an illustrative embodiment of this invention, it will be helpful to review the basic operating steps of a user application as shown by the sequence 41 in FIG. 2. When a user application, such as the USR2 application 34, is initialized, step 42 performs certain preliminary functions that are not relevant to this invention. Then step 43 opens one or more relevant data sets. For example, the USR1 application 33 could open the DS1 and DS3 data sets 35 and 37 while the USR2 application 34 could open the DS2 data set 36. In part of that process the USR1 and USR2 applications 33 and 34 retrieve the corresponding data set metadata in step 44. Of importance to this invention, the metadata will include MVS catalog information that provides a volume serial number which the system maps to a particular logical device and UCB at any point in time. The VTOC provides the extent list with a set of cylinder and head ranges.

Step 45 performs the application function using the metadata it has retrieved for controlling I/O requests with various input-output units including for example, the data storage facility 22 in FIG. 1, and particularly the DS1 data set 35, the DS2 data set 36, and the DS3 data set 37. Moreover, each application that opens a data set to be migrated continues to use the original metadata for that data set until the application closes that data set. That is, when an application terminates, step 46 closes any open data set or data sets that the application opened in step 43. However, when one application closes a data set, it is possible for that data set to still be opened to another application. An understanding of this process is important because when an application closes a data set after a migration occurs, the application accesses the migrated data on a target logical device directly when the application subsequently opens the data set.

Logical Data Migration

Command

In many situations a set of configuration statements control the operation of control applications, like the logical data migration application of this invention. In some control applications, a set of one or more configuration statements may initiate different phases of the control application. In an implementation of this invention, different configuration statement sets will enable the commencement of initialization, migration and diversion, and termination phases. It is within the skill of those in the art to generate the necessary configuration statements with knowledge of the function of the control application and the specific configuration of the data processing system.

For purposes of this explanation, a "command" represents a set of configuration statements and describes the information related to this invention to enable a person to prepare the necessary configuration statements. A given command will be considered to have the capability of controlling the commencement of a single phase or multiple phases in sequence. Also each phase will be considered to be implemented as a module for performing that specific phase.

Figure 3:
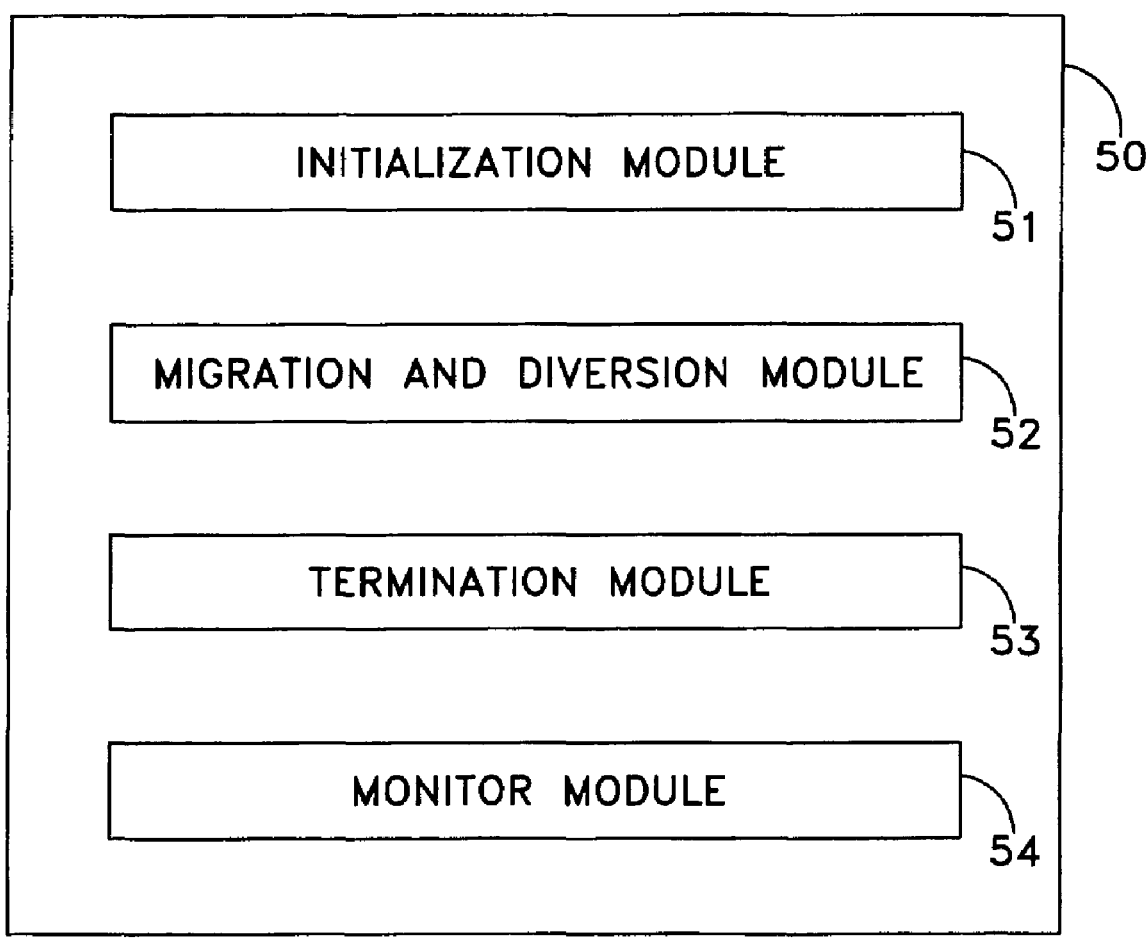
FIG. 3 is a block diagram of the organization of a logical migration application that operates in accordance with this invention.

With this background, FIGS. 1 and 3 depict one example of a Logical Device Migration (LDM) application 50 that can be characterized as migrating one or more data sets from a plurality of extents in one or more source logical devices to one or more target logical devices. As an aid to understanding this invention, this specific LDM logical application is expressed as having four separate operating modules, each representing a specific function or related group of functions. These include an initialization module 51, a migration and diversion module 52, a termination module 53 and a monitor module 54.

When the LDM application 50 is loaded into the memory 24, as in the private application memory 25, it enables the processor 21 to respond to an LDM command that has information in the form of arguments or fields. Basically the command will include the following information:

1. A command identifier, such as "LDM" or an equivalent operation code, which identifies the command as a logical data migration command.
2. Arguments identifying the modules of FIG. 3 to be executed in response to the command. For example, these could include an initialization argument, a migration-and-diversion argument, a termination argument, a monitor argument, or some combination of some or all of those arguments;
3. An identification of the source data sets that will be identified by name, either specifically or via pattern matching, and/or by identifying the various source volumes. Identification of the target logical devices will be made either specifically or via rules such as those used by IBM's Storage Management System, i.e., the so-called Storage Group, or similar facility. There are a variety of ways known in the art to identify data groups, sets and extents in a data storage facility;
4. A threshold argument that establishes the number of cylinders or tracks below which the remaining tracks are copied with application I/O quiesced to establish full synchronization and a mirrored state;
5. When data sets are organized in data groups, an argument can determine whether the group migration is to occur in a consistent manner; and
6. In a multi-host network, such as shown in FIG. 1 formed with another host 21A, whether the host is a primary, or owner, host or a secondary, or non-owner, host.

Figure 4:
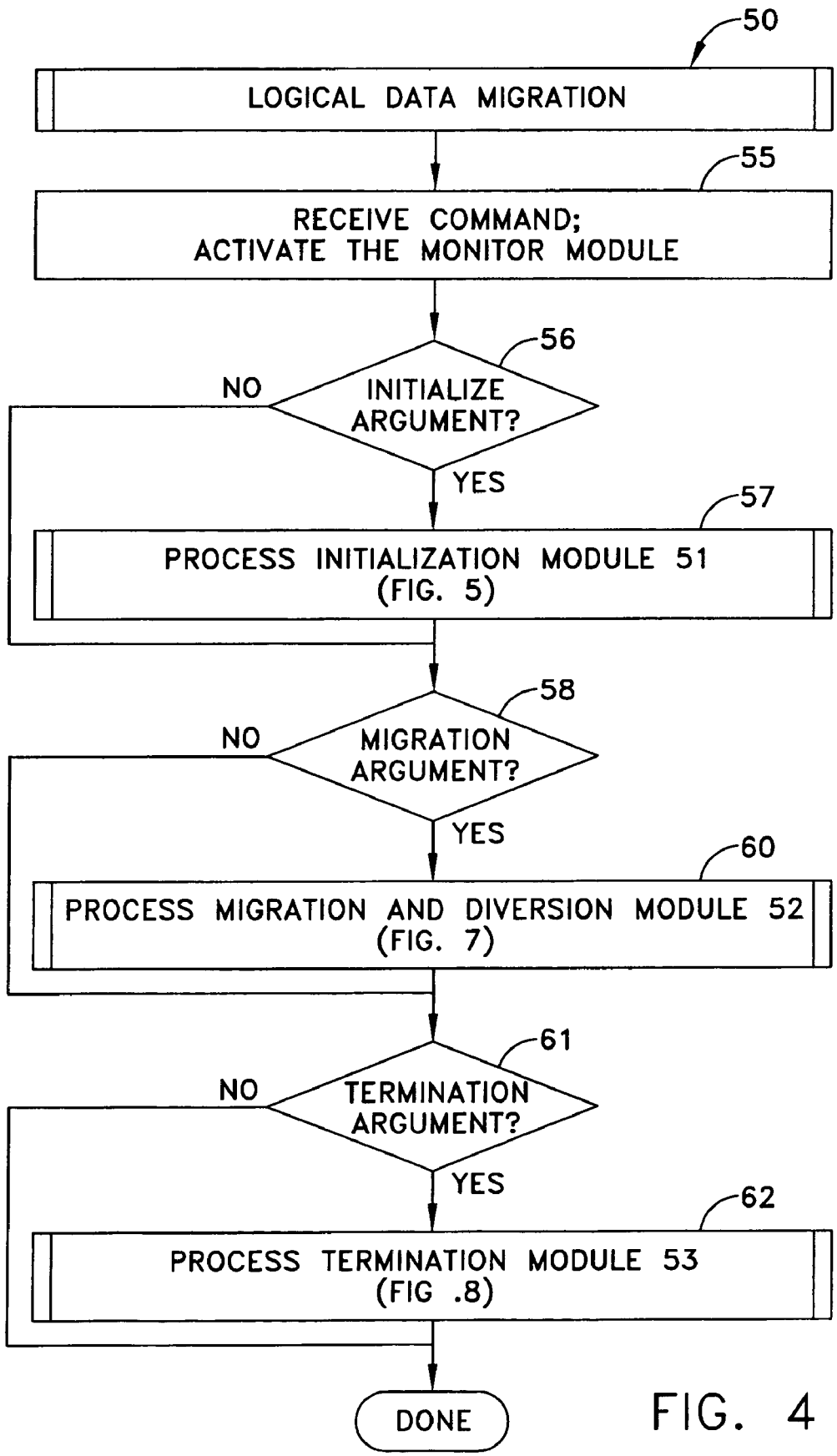
FIG. 4 is a flow diagram that depicts the operation of the logical migration application in response to a command.

Once the logical data migration application is loaded and activated, the execution of an LDM or equivalent command will initiate any of a variety of operations or sequences as depicted in FIG. 4. For example, step 55 represents the receipt of the command and activation of the monitor module 54 for transactions between that host and any extent to be migrated in response to the LDM command. Step 56 and 57 process the initialization module 51 according to FIG. 5 in response to a valid argument. If the migration-and-diversion argument is valid, step 58 enables step 60 to process the migration and diversion module 52 in accordance with the steps shown in FIGS. 7 through 10 that migrate the data. If the termination argument is valid, step 61 enables step 62 to process the termination module as shown in FIG. 11. This particular implementation would enable all the procedures shown in FIG. 3 to be processed in sequence in response to one command. However, as will become apparent, a first command typically may include only a valid initialization argument or both a valid initialization argument and a migration and diversion argument. Some time later an LDM command would be issued with only a valid termination argument.

Logical Data Migration

Initialization Phase

When an LDM command with the initialization argument is received, the LDM application 50 utilizes the initialization module 51 to generate control data structures that identify the location of the extents in the source logical device and locations in the target storage logical device for each extent to be migrated. The initialization module also stores configuration information related to the source and target logical devices.

Figure 5:
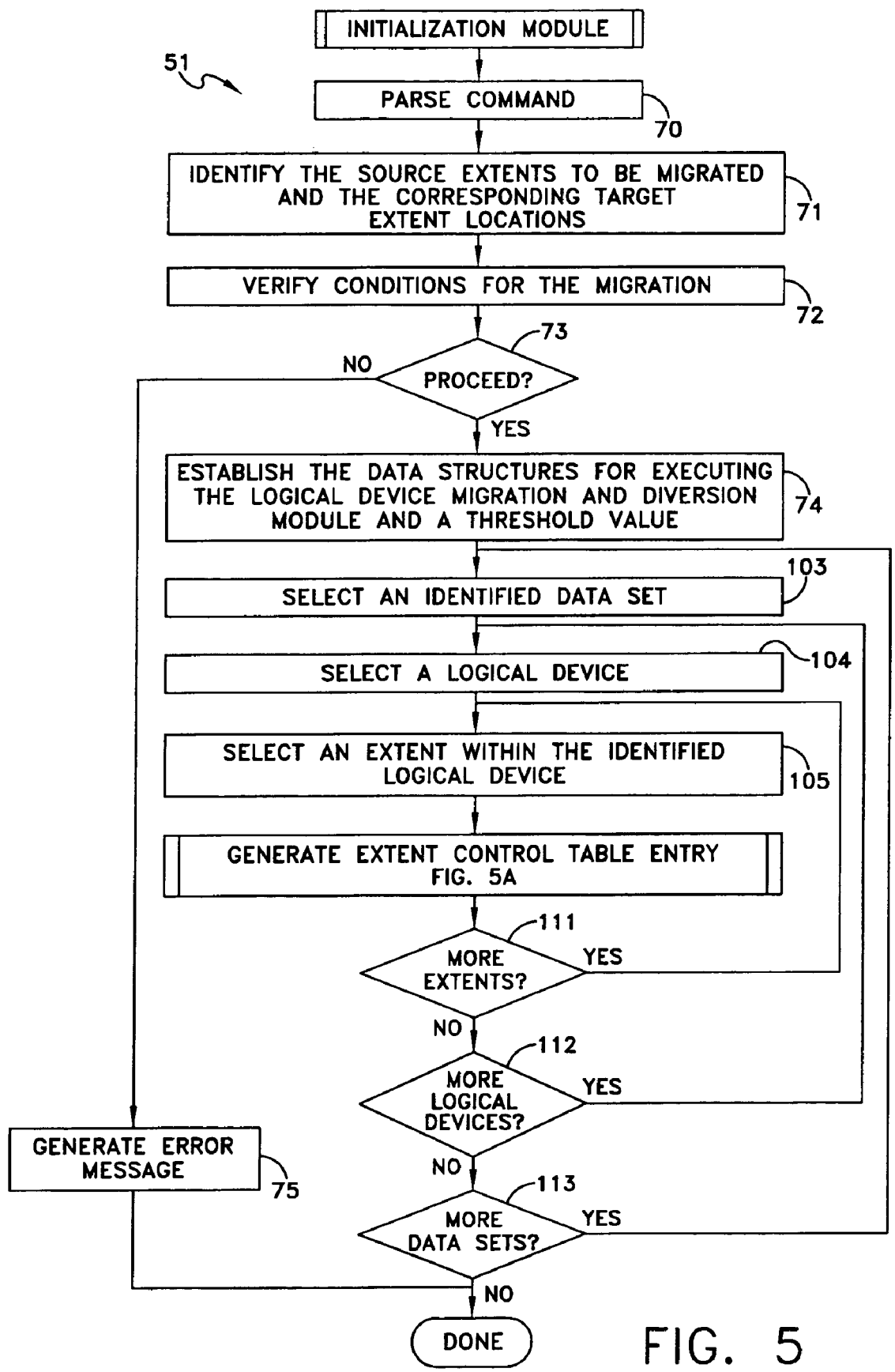
FIG. 5 is a flow diagram of the operation of an initialization module shown in FIG. 3.

More specifically, upon receipt of a command with the initialization argument set, step 57 in FIG. 4 transfers control to step 70 in FIG. 5 that parses the LDM command in step 71. Parsing provides information from the LDM command that identifies the need for consistent data migration and the threshold value. Parsing the LDM command also provides information from which the source extent and the corresponding target extent locations can be determined.

Step 72 verifies the conditions for the migration are satisfied. For example, verification could include determining whether the source and target logical device are compatible. When the conditions are verified, step 73 transfers control to step 74 to continue the initialization module. Otherwise step 73 transfers control to step 75 to generate an error message and terminate any further response to the command, effectively aborting the logical data migration.

Figure 6:
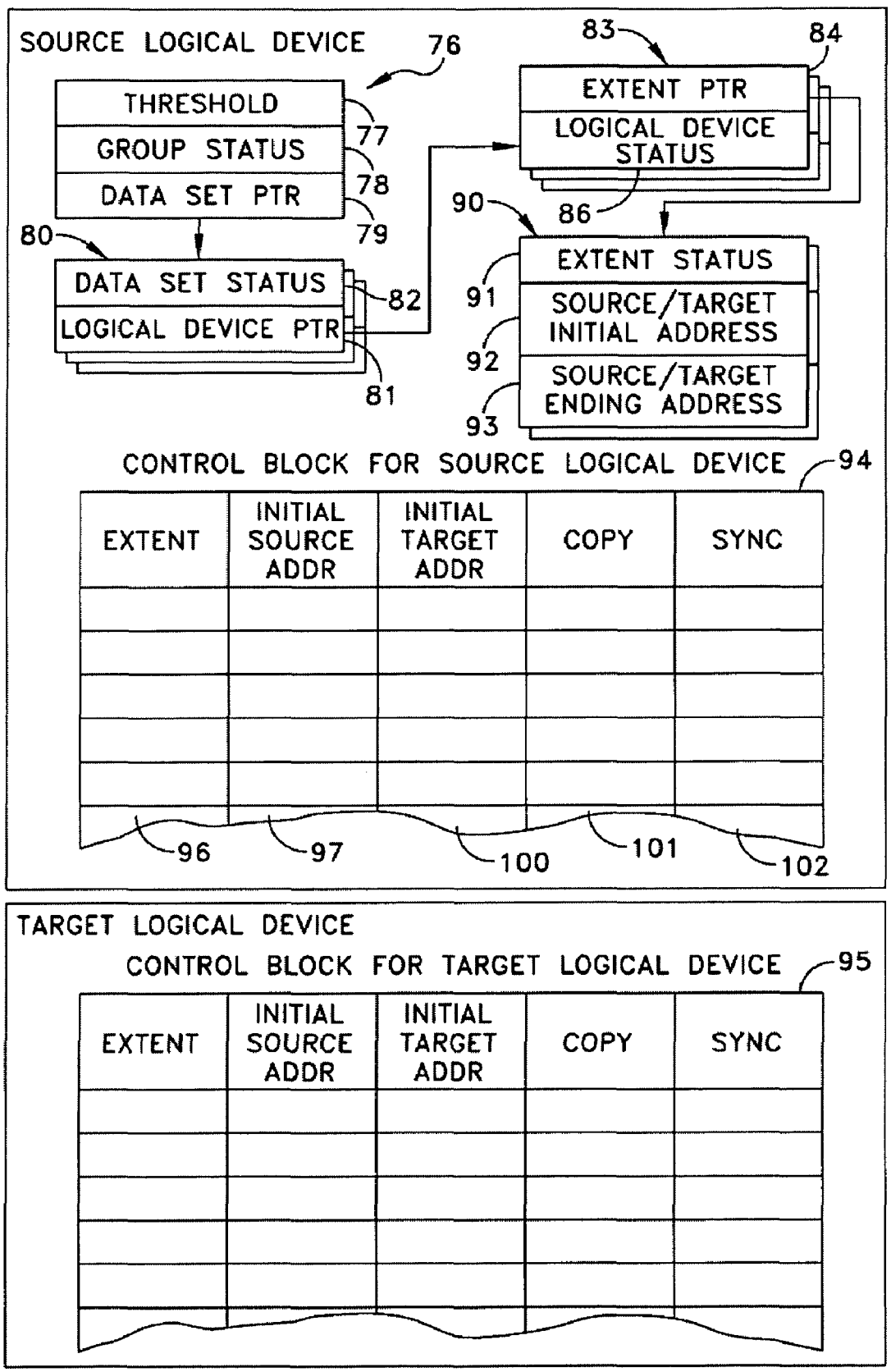
FIG. 6 is a block diagram depicting one example of a data structure generated by the initialization module shown in FIG. 5.

Step 74 establishes data structures corresponding to those shown in FIG. 6 for use during the execution the logical device migration and diversion module 52. It also loads the threshold value upon the corresponding argument or the LDM command. Specifically, FIG. 6 depicts data structures with a group block 76 that receives in different locations a threshold value entry 77, a group status entry 78 and a data set pointer 79. The data set pointer 79 identifies a location for a first data set block 80. Each data set block, such as data set block 82, has locations for a logical device pointer 81 and a data set status entry 82. Each data set block will also include any of various known means to link the individual data set blocks for all the data sets in the group.

The logical device pointer 81 points to a first logical device block 83 that includes locations for an extent pointer 84 and a logical device status entry 85. The extent pointer 84 typically identifies the location of a first extent block, like the extent block 90, for the selected logical device. Links to all other logical devices associated with the data set will also exist.

An extent block 90 includes specific information about a specific extent. One location contains an extent status entry 91. Other locations store representations of addresses, such as initial source and target addresses 92 and ending addresses 93. Each of the addresses 92 and 93 can be constituted by an absolute address or a base address or offsets or by some address convention. In the same manner as previously described, links are provided for all the extent blocks associated with a single logical device.

Still referring to FIG. 6, the data structures include track-cylinder control blocks, hereinafter "control blocks", 94 and 95. Control block 94 and blocks 76, 80, 83 and 90 are stored in association with the source logical device. In FIG. 1, the information would be stored in the data storage facility 22. These data structures may be stored in cache memory, a physical disk or both, depending upon the configuration of the data storage facilities. Typically, however, the source logical device control blocks and data pointers will also be stored in the main memory 24 of FIG. 1. Control block 95 typically will be stored on the target logical device.

In an embodiment where control is desired on a track-by-track basis, each entry in the control blocks 94 and 95 includes an extent status entry 96, a single source track address in column 97 and a corresponding target track address in column 100. If an extent occupies one or more complete cylinders, the source and target address entries in columns 97 and 100 can define the address only to the cylinder level. In that event each row in the control blocks 94 and 95 will identify an initial cylinder address. If the extent does not begin and end at a cylinder boundary, the entries will be to a cylinder and head address to provide individual track addressing.

A COPY column 101 records, for each track, whether the track still requires copying. In some situations the copy column 101 may be constituted by a track table associated with the source logical device. In such a case, the control blocks 94 and 95 may also include a SYNC column 102 to reflect the tracks that need to be copied.

Referring to FIGS. 5 and 6 together, after step 74 establishes the data structures in FIG. 6, the remaining steps of FIG. 5 populate the various data structures. As part of this process, step 103 selects one of the identified data sets, such as the data set identified by the data set pointer 79. Steps 104 and 105 use information from the ICF to identify the location of each logical device that stores extents for that data set and one of the extents. In response, a process shown in FIG. 5A generates the extent block control table entries, with step 106 generating the starting and ending addresses for the extent in the source logical device. Step 107 provides the starting address for the extent in the target logical device. When this information has been loaded into blocks 92 and 93 in FIG. 6, respectively, step 108 sets a corresponding extent status entry, like the extent status entry 91, to an initial COPY value to indicate a COPY state.

Step 110 then populates each of the track cylinder control blocks 94 and 95 with data. That is, for each track or cylinder within the identified extent, step 110 makes an entry in a given row. Consequently a given extent may have a number of different entries in the track cylinder control blocks 94 and 95. In addition, step 110 will establish initial values for all the COPY bits in column 101 and all the SYNC bits in column 102 to indicate that each corresponding track must be copied. Step 110 also will set initial status values for each in corresponding status entry.

Figure 5A:
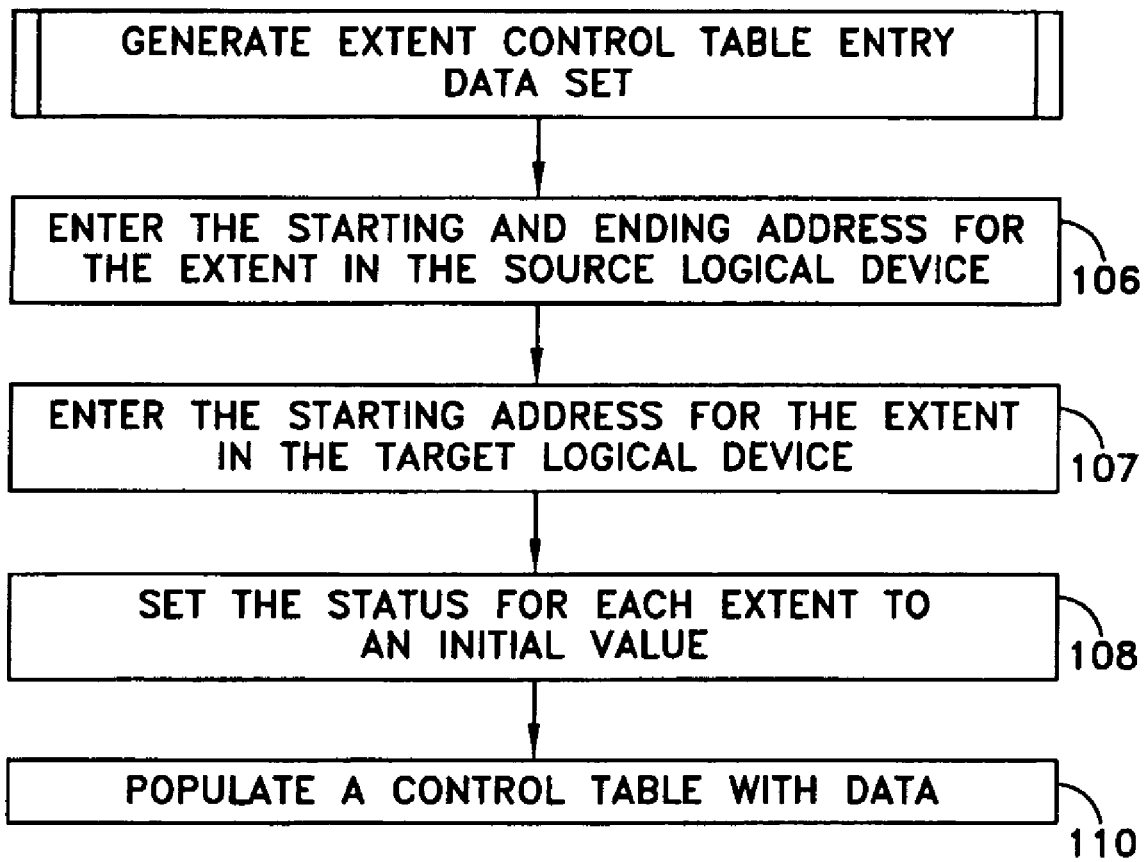
FIG. 5A is a more detailed flow diagram of an operation shown in FIG. 5.

Referring back to FIG. 5, the module uses step 111 as a loop control to assure that the procedure of FIG. 5A populates extent blocks 90 and track cylinder control blocks 94 and 95 for each track in the identified extent. If an additional extent must be processed within the data set, control passes from step 111 back to step 105.

When all the control data for the extents of a data set in the selected logical device have populated the control data structures, step 111 transfers control to step 112 that assures all the logical devices in the data set are processed. If they are not, control passes back to step 104 to select another logical device containing extents for the data set selected in step 103. When all the extents in all the logical devices for a data set have been processed, step 112 transfers control to step 113. Step 113 is a loop control to assure that all the data sets identified in the LDM command have been processed. If additional data sets exist, control passes from step 113 back to step 103. When all the data sets have been processed, operations of the initialization module 51 cease and the data structure in FIG. 6 is fully populated.

Thus, when the initialization module 51 completes its operation, an environment exists for controlling the data migration. The monitor function is active and the data structures are active. Now, by virtue of an LDM command sent with both valid initialization and migration-and-diversion arguments or a subsequent LDM command with a valid migration-and-diversion argument, the migration and diversion begins.

Logical Data Migration

Migration and Diversion Phase

Figure 7:
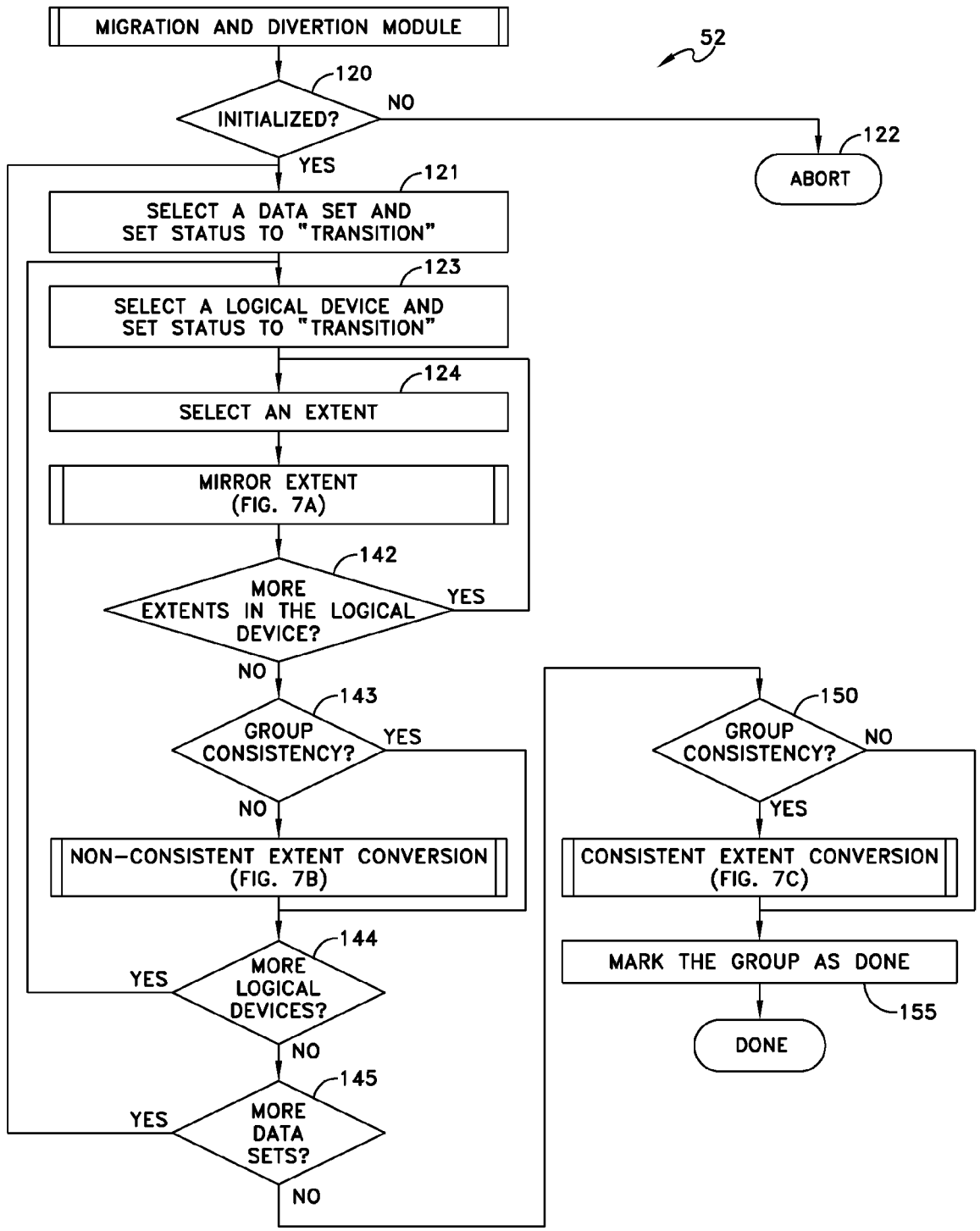
FIG. 7 constitutes a flow diagram of the operation of a migration and diversion module shown in FIG. 3.

FIG. 7 generally depicts the operation of the migration and diversion module 52 by which the migration of data occurs on an extent-by-extent and logical device-by-logical device basis for each data set involved in a data migration. The process begins at step 120 to verify the initialization module 51 has completed the initialization phase. If the initialization phase has been completed, step 120 transfers to step 121 to initiate the remaining steps of the migration and diversion module. Otherwise step 120 transfers control to step 122 that generates an abort message and the migration and diversion phase ends.

Step 121 selects a data set and changes the data set status entry, such as the entry 82 of FIG. 6, to a TRANSITION value. Step 123 performs a similar operation by selecting a logical device in the data set and setting its logical device status entry to a TRANSITION value. The TRANSITION value denotes that the logical device is undergoing a transition to a MIGRATED state.

Figure 7A:
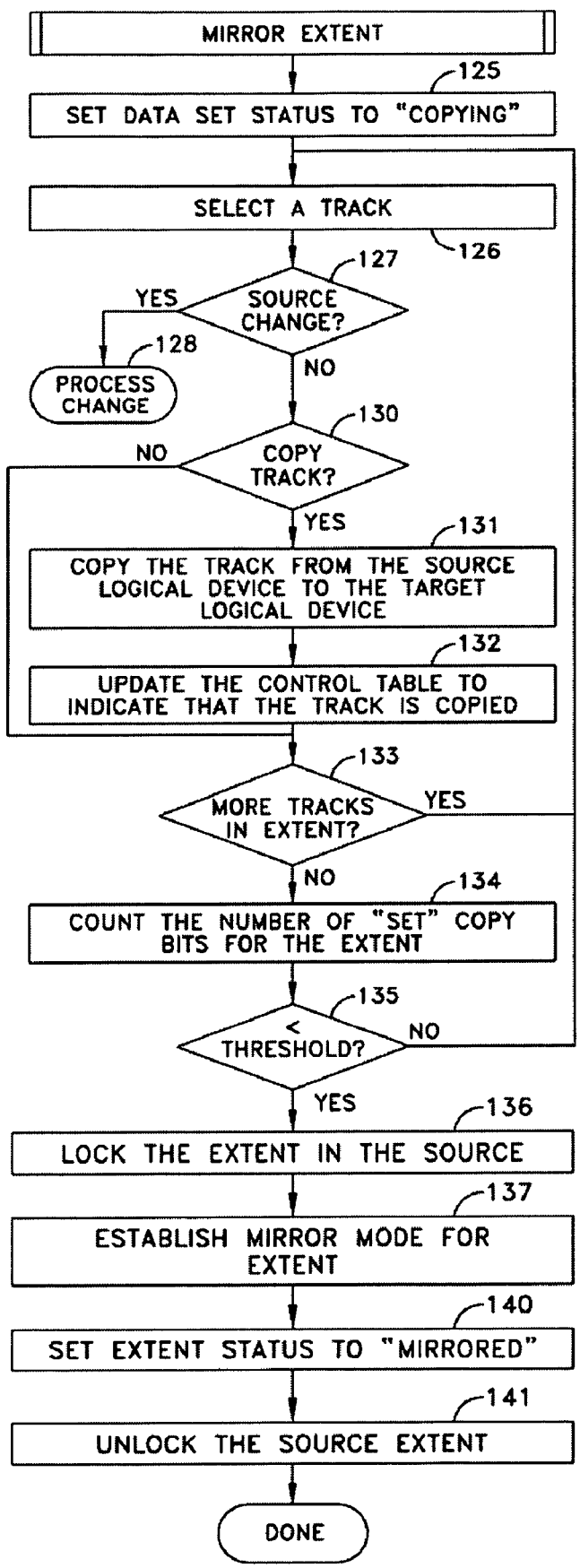
FIGS. 7A, 7B and 7C are more detailed flow diagrams of operations shown in FIG. 7.

Next step 124 selects an extent, such as the extent represented by block 90, to be mirrored. As shown in FIG. 7A, step 125 is a first step in a "mirror extent" processes. Step 125 sets the extent status entry, such as entry 91, to a COPYING value to indicate that the extent is being copied to the target logical device. If an extent is not defined by one or more complete cylinders, step 126 selects a track in the extent. Step 127 determines whether any external operations have changed the source extents based upon information acquired by the monitor module 54 in FIG. 3 or other resources. If a change has occurred, the migration and diversion phase ends through a procedure 128 that processes the change. Otherwise control transfers to step 130.

Step 130 looks to the source control block 94 to identify the specific source track for the identified track in a track row. If the corresponding COPY bit in column 101 is set, step 130 transfers to step 131 to copy the data in the source logical device track to a corresponding track in the target logical device as defined by the track address in the control block 94. Step 132 alters the state of COPY bit and or SYNC bit, depending upon the specific implementation, in the track cylinder control blocks 94 and 95 to indicate that the track has been copied. After step 132 performs its function or if step 130 determines a selected track has already been copied, control transfers to step 133. If more tracks exist in the extent, step 133 returns control to step 126 to select a next track. Alternatively, if the selected extent in the data set is defined at the cylinder level, steps 130 through 132 can be modified to establish the various operations at a complete cylinder level rather than at a track level.

When an extent has been processed in this loop, step 133 transfers control to step 134 that counts the number of set COPY bits, or SYNC bits, for the extent existing in the source logical device control block 94. As will be described later, a user application can alter data in the extents during the COPYING state. Consequently, at the end of a pass through the loop, it is possible that copied tracks have been changed. So the data in the changed tracks must be copied again. Step 134 determines how many tracks need to be recopied. If the number of tracks is at or above a particular threshold as established in the threshold block 77 of FIG. 6, step 135 returns control to step 126 to process the extent again by selecting a track.

This loop comprising steps 126 through 135 continues until a predetermined condition has been reached; in this specific embodiment, the predetermined condition is reached when the number of tracks requiring copying reduces to a value that is below the threshold. Then step 135 transfers control to step 136 in FIG. 7A that is a first step in a process for synchronizing the data in the target logical device extent to the data in the source logical device extent.

This is a serialized process, so step 136 locks the extent in the source logical device to prevent any interaction between applications and the source logical device extent. Step 137 then completes the mirroring operation by transferring the data from any remaining changed tracks to the target logical device. As will be obvious, no interaction with any host application can occur during this interval. When this step has completed, data in the extent of the target logical device mirrors the data in the corresponding extent of the source logical device. Step 140 updates the extent status in a corresponding extent status entry, like the entry 91, to a MIRRORED value indicating that synchronism has been achieved for that extent. Step 141 then unlocks the source extent to re-enable communications between the host and the extent.

After step 141 unlocks the extent, it is again available to user applications. Then control returns to FIG. 7, particularly step 142. If there are more extents in the logical devices, step 142 transfers control to step 124 to repeat the process for mirroring the next extent.

When all the extents in a data set have been transferred, step 142 in FIG. 7 transfers control to step 143 that determines whether the migration is being performed in a consistent fashion. Specifically, step 143 tests the consistency argument in the LDM command. If the argument is valid, the diversion to data migrated to the target logical device or devices is to occur at the same time. In that case, step 143 transfers to step 144 to determine if additional data set extents in other logical devices need to be processed. If extents in additional logical devices for a data set need to be processed, step 144 transfers control back to step 123 to select another logical device containing extents for the selected data set. If all the logical devices have been processed, step 144 transfers control to step 145 to see if extents in additional data sets need to be processed.

Figure 7B:
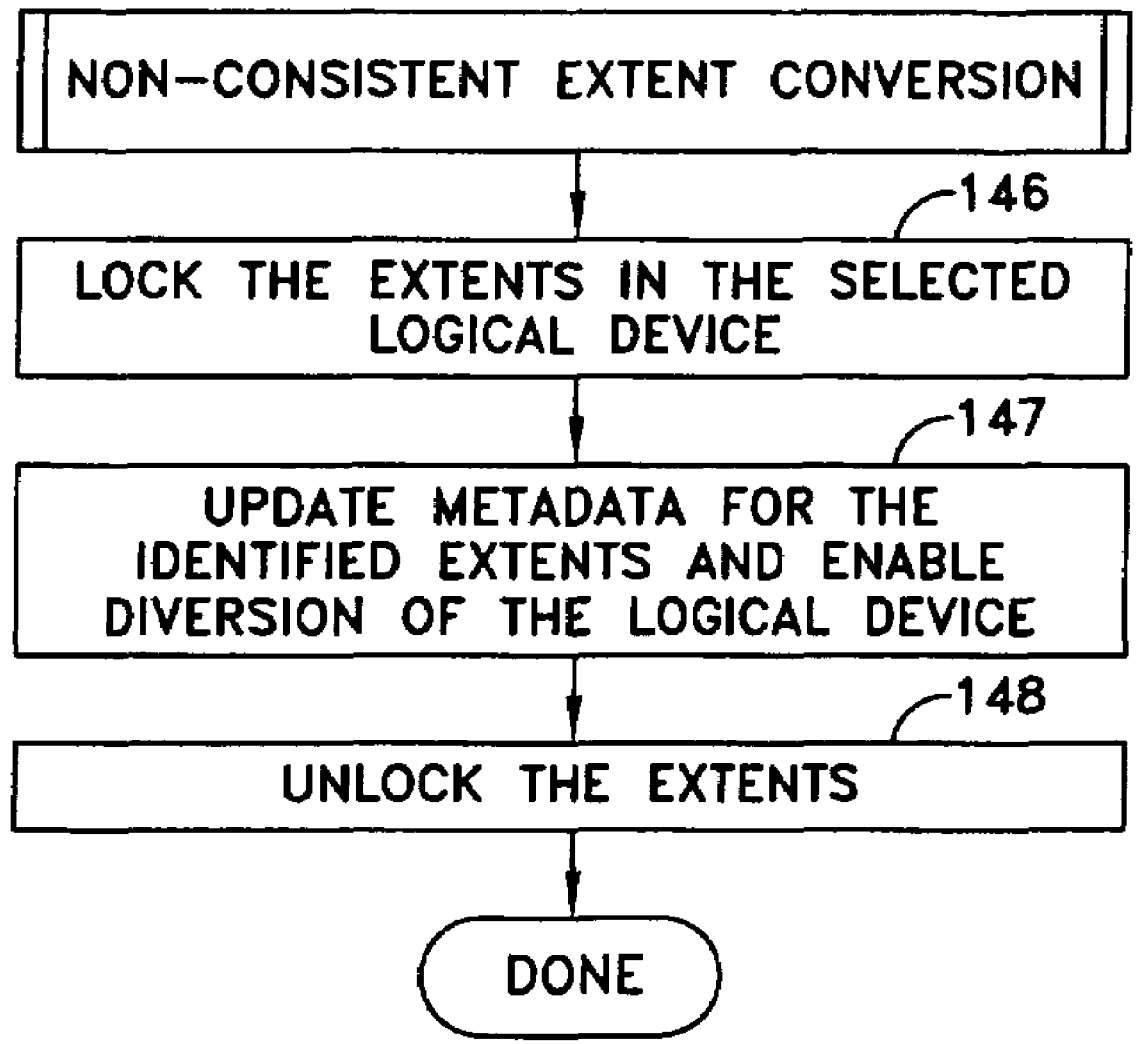

If group consistency is not required, step 143 transfers control to initiate a serialized "non-consistent conversion" process as shown in FIG. 7B where step 146 locks the extents in the selected logical device. Step 147 then updates the metadata for the identified data set extents in the logical device. Step 147 also sets status for the data set to indicate a DIVERTED state by updating a logical device status entry, like the status entry 86 in FIG. 6, and all the corresponding extent status entries, like the entry 91. Step 148 then unlocks the source data set extents and control transfers to step 144 in FIG. 7.

When steps 144 and 145 determine that all the data sets have been completed, step 145 transfers control to step 150. Assuming the group consistency argument was not set in the LDM command, no further action is taken.

When group consistency is required, a "consistent extent conversion" process beings. As will be apparent, the non-consistent extent conversion and consistent extent conversion are mutually exclusive. Like the former, the consistent conversion is a serialized process. This process begins when step 150 transfers control to step 151 in FIG. 7C that locks all the source extents for all the data sets in the group concurrently. Step 152 then updates the metadata for all the source data sets and their extents in the designated group. Next step 153 shifts that status for all the data sets, logical devices and extents in the group to DIVERTED values by updating the extent and data set status entries, such as the entries 78, 82, 86 and 91. When this is complete, step 154 unlocks all the source extents in the group. Control then returns to step 155 in FIG. 7 to mark the identified group as DONE by updating the group status entry 78.

Figure 7C:
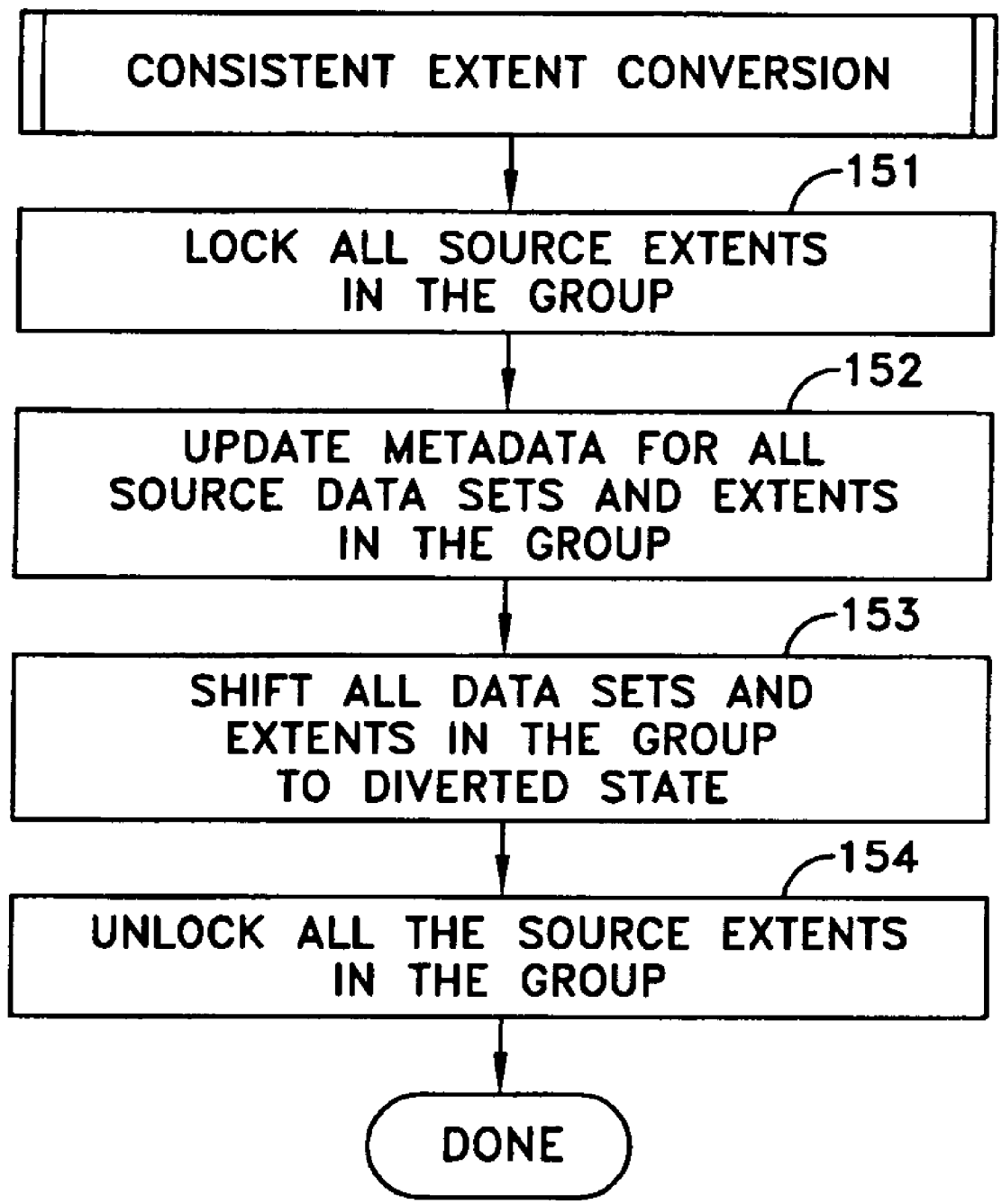

Thus when the migration and diversion module of FIG. 7, including the procedures of FIGS. 7A, 7B and 7C, completes its operation, all I/O requests are diverted to the target logical devices. Eventually the diversion process can also be terminated so the storage areas associated with the migrated data sets can be used for other purposes.

Logical Data Migration

I/O Requests

Figure 8:
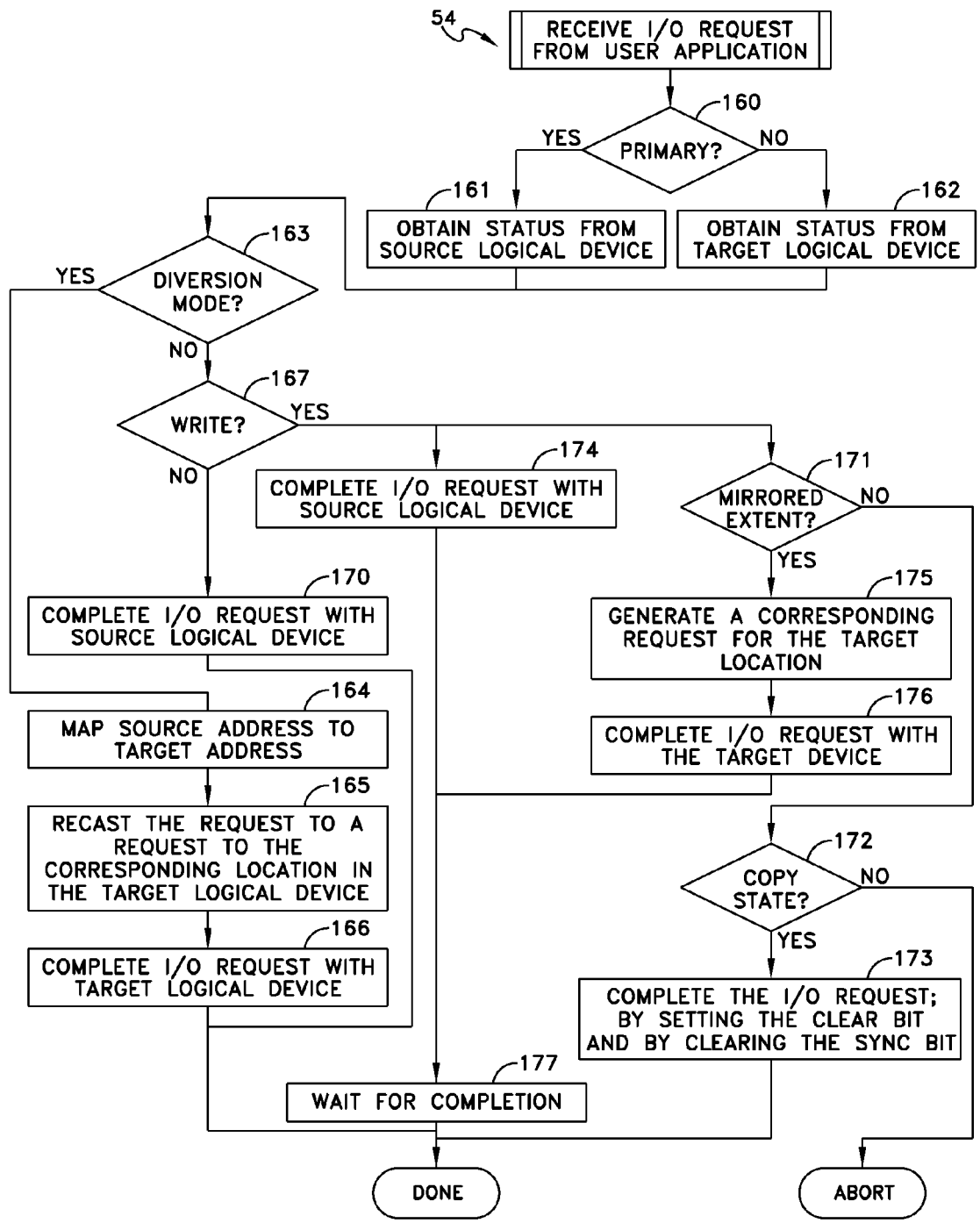
FIG. 8 is a flow diagram of the operation of a monitor module shown in FIG. 3.

To minimize the impact of making a logical data migration concurrently with the normal handling of input-output requests from host applications, it is necessary to continue to respond to I/O requests from such host applications for data even as the extents are being migrated. The monitor module 54 performs this necessary function. Such modules can operate by intercepting I/O requests for special processing by the monitor module 54 as known in the art, one example being disclosed in U.S. patent Ser. No. 10/283,976. FIG. 8 depicts the actions of the monitor module 54 in response to I/O requests from user applications, such as the USR1 application 33 or USR2 application 34 in FIG. 1.

This embodiment of the monitor module 54 also is adapted for use in systems that have multiple hosts. In a multi-host system, one host, like the host 21, is designated a "primary host" or "owner" host. An "owner" is established at group activation time as being the best host to manage the process for a particular data set group. In particular, most if not all of the actual data migration is likely to be done by the Owner. Certain command functions may only be satisfied by the owner although this may be made transparent to the user. Other hosts, such as the host 21A in FIG. 1, are "secondary" or "non-owner" hosts. The non-owner hosts must at the very least monitor I/O requests to the effected data sets and actively participate in the mirror and diversion phases. Each primary and secondary host uses an instance of monitor module 54 to intercept I/O requests while the data migration process is underway with some minor modifications. Thus, it is possible to migrate data from an extent that is accessible to applications in multiple hosts.

Assuming that the requests for a data transfer in a data set being migrated originates with the same host 21 as is processing the migration and diversion module 52 associated with the LDM application 50, step 160 transfers control to step 161 to obtain status, address and other information from the source logical device data structures. Step 160 is representative of the process that monitors operations including the monitoring of changes that is useful in step 127 of FIG. 7A. If the monitor module is operating as a secondary host, step 160 transfers control to step 162 thereby to obtain status and other information from the control block 95 in the target logical device. Step 162 is analogous to step 161. Once this information has been obtained, control transfers to step 163.

Step 163 determines whether the I/O request is directed to a track in a diverted extent as indicated by a corresponding extent status entry, such as in the extent status entry 90 in FIG. 6. If it is, step 163 in FIG. 8 transfers to step 164 that utilizes the status and other information in FIG. 6 to convert the source track address to a target track address. Step 165 recasts the received I/O request to a request to the corresponding location in the target logical device. Step 166 completes this I/O request with the target logical device. No transfer occurs with the track in the source logical device.

During the transition to the DIVERTED state, individual extents exist in either the COPY or MIRRORED states. In that event step 163 transfers to step 167 to determine whether an I/O request includes any write commands. If the I/O request contains only read commands, control transfers to step 170 to retrieve the requested data from the source logical device. There is no need for a read command to interact with an extent in the target logical device prior to the shift to a DIVERTED state. Then the response to the read-only I/O request is complete.

If a write command to an extent is included in an I/O request prior to the shift of the extent to the DIVERTED state, each write command must be handled in a way that assures each identified track in the target logical device remains synchronized to the source logical device track. If the extent is in a COPY state, steps 171 and 172 transfer control to step 173. In this step, the monitor module 54 uses step 174 to complete each write command by updating only the identified tracks with the source logical device. However, step 173 updates the COPY bit and SYNC bit to states indicating that the track needs to be copied again. As a result, the changed data will be transferred to the target logical device thereafter. This completes the response to a write operation involving an extent in the COPY state.

If the extent being written is in the MIRRORED state, step 174 again completes the request for the source logical device. In parallel, step 171 transfers control to step 175 to generate a request to the target logical device using the available mapping data. Step 176 completes the request to the target logical device by writing the data to the corresponding track in the target logical device. Consequently if data is written to a MIRRORED extent the operation of FIG. 8 assures that the changed data sent to the two effected tracks remain identical. For either write operation, step 177 represents an action of waiting for the completion of both parallel processes before indicating that the write operation has been completed.

When the metadata for a data set, or in the case of a consistent group all the data sets being migrated, is updated, all the information necessary to identify the configuration and addresses of the data sets is altered to point to the new locations in the target devices at one time. While any application is open, however, the diversion operation of FIG. 8 continues. However, when an application is stopped and then started, i.e., is recycled, after the data set extents in a logical device are in a DIVERTED state, the application opens the data set with the new or updated metadata based on the various information available concerning storage locations, such as catalog, VTOC and other tables. Thereafter read/write requests from that application directly interact with the target device. There is no further requirement for interaction with the source logical device or for the operation of the monitor module functions shown in FIG. 8.

Logical Device Migration

Termination Phase

Figure 9:
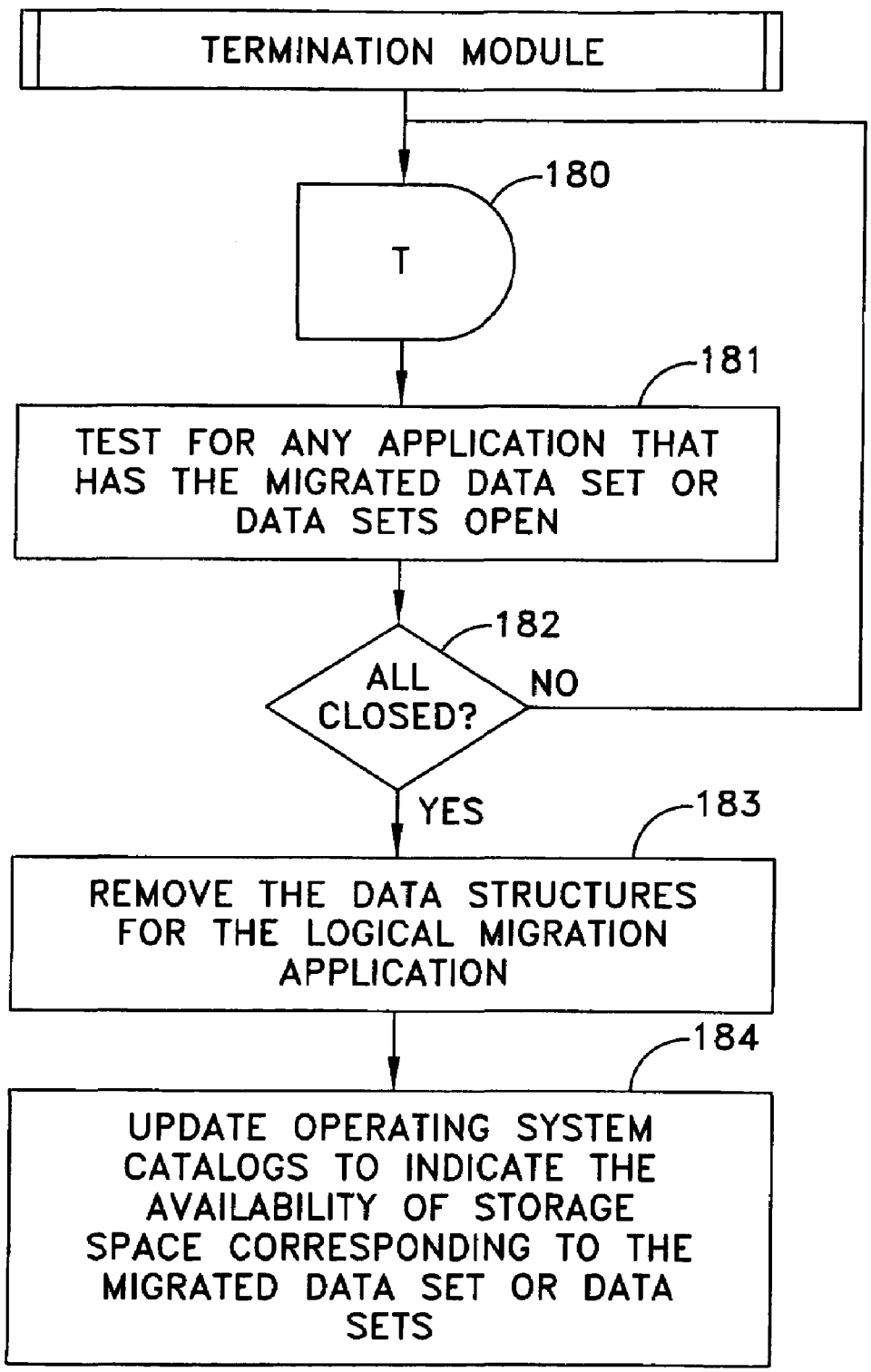
FIG. 9 is a flow diagram of the operation of a termination module shown in FIG. 3.

When all applications that were running at the time of the data migration have terminated once after a migration, there is no requirement to retain the source data sets. When this condition exists, the system can enter the termination phase. As shown in FIG. 9, the termination module 53 includes a delay 180 that might be used during the process. Step 181 tests to determine whether any application started before the data migration continues to run. If not all the applications have recycled, step 182 transfers control back to step 180 to wait for some arbitrary time before trying this test again. In some situations it may become necessary to terminate and immediately restrict any application that had been initiated prior to the logical data migration in order to complete the termination process.

In either event, when all applications that were interacting with data during the logical data migration have been closed once since the migration has been completed, step 183 can remove the data structures for the logical migration application, such as the data structure shown in FIG. 6, from all related areas of the data processing system. Step 184 then can update the VTOC or any equivalent data structure to make the locations for the migrated source extents available for other purposes.

The foregoing description relates to a specific embodiment of a method and apparatus for migrating one or more data sets from one or more source logical devices to one or more target logical devices. The data migration may involve a single data set of a single extent or multiple extents. Further, the data migration may involve groups of data sets with the option of performing the transfer of all the data sets in a group in a consistent manner. In whatever form, the migration is transparent to other applications that may be using the data concurrently. The process involves only minimal interruption in data processing by such user applications.

The various objectives of this invention are realized by means of the utilization of a logical data migration application that responds to a command. The command identifies all the extents to be migrated in a source logical device and locations in the target logical device to receive those extents. As there is a corresponding address in the target logical device for each extent in the source device, it is possible for diverse extents and data sets to be transferred to a single logical device, unlike prior art data migration systems. At initialization the process generates and populates various control data structures. During migration and diversion, the application copies extents on a track-by-track or cylinder-by-cylinder basis for one or more source logical devices to one or more target logical devices based upon address information in the control data structures. During these operations, a monitor module responds to I/O requests from other applications to the extent in this phase by processing the request and, in the case of write operations, updating the information in the control data structures.

During migration and diversion each extent in the target logical device is mirrored from the corresponding extent in the source logical device in a serialized process. During this process a lock is placed on the extent being mirrored for the duration of time to copy any as yet un-copied tracks to the target device without interruption by a user application. As the serialize process acts on extents, the likelihood that the interruption will effect an application is minimized. After an extent is mirrored, the monitor function responds to write requests by updating both the source and target logical devices.

After the data set extents in a logical device or a group of data set extents in multiple data sets have been mirrored, the migration and diversion module shifts each extent to a DIVERTED state, the timing of which is dependent upon the requirement for group consistency. After the data set extents in a logical device are diverted, the monitoring function intercepts all I/O requests and recasts them to a target address and reissues the request.

This diversion operation continues to handle all I/O requests from any application until such time that application closes a data set. When the application opens that data set again, I/O requests will be directed to the target logical device because at the time of the diversion all the metadata related to the diverted data sets is updated.

This invention has been disclosed in terms of certain embodiments. It will be apparent that many modifications can be made to the disclosed apparatus without departing from the invention. For example, this invention has been described with respect to a specific implementation of the invention in a Symmetrix data storage facility available from the assignee of this invention. However, the basic functions that implement the logical data migration of this invention are readily adapted for other types of data storage facilities. The disclosure additionally includes specific references to organizations of the logical data migration modules such as shown in FIG. 3 and specific sequences of operations as shown in FIGS. 4, 5, 5A, 7, 7A, 7B, 7C, 8 and 9. Variations in these sequences and the specific functions of each particular step may be altered to implement the invention with another type of data storage facility or for the purpose of integrating the logical data migration system with other applications or for utilizing existing utilities such as available in commercially available operating systems. Further, the invention has been described in terms of a specific transfer between two logical devices and a source data storage facility and a single logical device in a target data storage facility. The invention is equally applicable to performing migrations within a single data storage facility.

It will be apparent that FIG. 6 depicts a specific data structure and organization. Persons of ordinary skill in the art will have the knowledge to implement this specific structure and organization or to adopt other structures and organizations for implements the specifically disclosed structures and organization.

Therefore it is the intent of the appended claims to cover all the foregoing and such other variations and modifications as come within the true spirit and scope of this invention.

What is claimed as new and desired to be secured by Letters Patent of the United States is:

1. In a data processing system in which at least one active application interacts with at least one data set, a data set having a defined plurality of extents in a source logical device, each data set being characterized by metadata that provides a basis for correspondence between logical device and data request addresses, a method for migrating the defined plurality of data extents to a target logical device in a consistent fashion concurrently with interaction between any of the at least one application and the defined plurality of data sets throughout the migration, said method comprising the steps in sequence of:
   A) establishing a first status and operating mode by generating control data structures for each of the source and target logical devices that identify the locations of each of the at least one data set extent in the source logical device and corresponding locations in the target logical device and status information related to the status and operating mode for each extent, data set, and logical device to be migrated,
   B) thereafter establishing for each extent a second status and operating mode during which data in the extent is copied asynchronously from the at least one data set in the source logical device to the target logical device and concurrently with interactions between the at least one application with the at least one data set in the source logical device,
   C) thereafter establishing a third status and operating mode for each extent in the data set during which the data in the corresponding extents in the source and logical devices are brought into and thereafter maintained in synchronism whereupon the extents in the source and target logical devices operate as synchronous mirrors such that any subsequent request to change data from any of the at least one active application during the third status and operating mode changes the data in the source extent and the corresponding data in the target extent is synchronously updated,
   D) thereafter establishing, concurrently with the interaction between any application and the data in an extent undergoing migration, a fourth status and operating mode wherein the metadata for each extent in the defined plurality of data extents is updated whereby each data request to an extent from any of the at least one active application is recast to interact in a diverted state with the data only in the corresponding extent in the target logical device, said establishment of the fourth status and operating mode for the defined plurality of data extents requiring that all the extents in the defined plurality of data sets be shifted to the diverted state simultaneously, and
   E) establishing, after all the applications that were interacting with the data in each data set being migrated during the fourth status and operating mode, a fifth status and operating mode during which the migration is terminated, control data structures are removed and operating system catalogs are updated.

2. A data migration method as recited in claim 1 including determining whether a data set extent is in the third or fourth operating mode and processing each data request to the data set extent in response to said determination.

3. A data migration method as recited in claim 1 including determining whether the extent is in one of the second, third and fourth operating modes and processing each data request to an extent in the data set in response to said determination.

4. A data migration method as recited in claim 1 including the step of generating control blocks that provide the correspondence between extent addresses in the source and target logical devices during the first operating mode.

5. A data migration method as recited in claim 4 wherein each extent includes a plurality of successively addressed storage locations and said control data structures include information relating to the status of each addressed storage location, said status being updated each time data in an addressed storage location is copied to the target logical device.

6. A data migration method as recited in claim 5 wherein a response to a data request to change data in an extent in the source logical device updates the data block status to enable the data to be copied to the target logical device.

7. A data migration method as recited in claim 1 wherein a response to a data request to transfer data to an extent during the third operating mode includes the step of transferring the data to the source logical device and generating a request based upon the address correspondence for transferring the data to the corresponding extent in the target logical device.

8. A data migration method as recited in claim 1 wherein a data request defines a source logical device location for an extent in the fourth operating mode and includes the steps of receiving the data request, obtaining the corresponding target logical device address for the location and generating a new data request with the corresponding location in the target logical device.

9. Apparatus for migrating a data comprising at least one extent in each of a defined plurality of data sets from a source logical device to a target logical device in a consistent fashion wherein each data set is characterized by metadata that provides a basis for correspondence between the logical device and data request addresses and wherein data transfer requests from any of at least one active application may be directed to and interact with the data set throughout the migration, said apparatus comprising:

A) means for establishing a first status and operating mode including means for generating control data structures for each of the source and target logical devices that identify the locations of each of the at least one data set extent in the source logical device and corresponding locations in the target logical device and status information related to the status and operating mode for each extent, data set, and logical device to be migrated, B) means for thereafter establishing for each extent a second status and operating mode including copy means for copying the data each extent undergoing asynchronously from the at least one data set in the source logical device to the target logical device and is copied concurrently with interactions between any application with any data set being migrated, C) means for thereafter establishing a third status and operating mode for each extent in the data set during which the data in the corresponding extents are brought into and thereafter maintained in synchronism whereupon the extents in the source and target logical devices operate as synchronous mirrors such that any subsequent request to change data from any of the at least one active during the third status and operating mode changes the data in the source extent and the corresponding data in the target extent is synchronously updated, D) means for thereafter establishing, concurrently with the interaction between the at least one application and the data in any extent undergoing migration, a fourth status and operating mode wherein the metadata for each extent in the data set is updated whereby each data request to the extent from any of the at least one active application is recast to interact in a diverted state with the data only in the corresponding extent in the target logical device, said fourth establishing means including means for requiring that all the data extents in the defined plurality be shift to the diverted state simultaneously, and E) means for establishing, after all the applications that were interacting with the data in each data set being migrated during the fourth status and operating mode, a fifth status and operating mode including means for terminating the migration after all applications that were interacting with the data set are closed, for removing the control data structures and for updating operating system catalogs.

10. Data migration apparatus as recited in claim 9 including means for determining whether a data set extent is in the mirrored or diverted state and means for processing each data request to the identified extents in response to said determination.

11. Data migration apparatus as recited in claim 9 including means for determining whether the extent is in one of the second, third fourth operating modes and means for processing each data request to an extent in the data set in response to said determination.

12. Data migration apparatus as recited in claim 9 including means for generating control blocks that provide the correspondence between extent addresses in the source and target logical devices.

13. Data migration apparatus as recited in claim 12 wherein each extent includes a plurality of successively addressed storage locations and said control data structures include information relating to the status of each of the addressed storage locations, said status means updating the status each time data in an addressed storage location is copied to the target logical device.

14. Data migration apparatus as recited in claim 13 wherein a data request is received to change data in an extent in the source logical device during the copy state, said status means updating the data block status to enable the data to be copied to the target logical device.

15. Data migration apparatus as recited in claim 9 wherein a data request is received to transfer data to an extent during the third operating mode, said apparatus including means for transferring the data to the source logical device generating a request based upon the address correspondence for transferring the data to the corresponding extent in the target logical device.

16. Data migration apparatus as recited in claim 9 wherein a data request is received defining a source logical device location for an extent in the data set during the fourth operating mode, said apparatus including means for receiving the data request, means for obtaining the corresponding target logical device address for the location and means for generating a new data request with the corresponding location in the target logical device.

17. A migration program stored in a memory that controls the migration of at least one data set comprising a plurality of extents from a source logical device to a target logical device in a consistent fashion wherein each data set is characterized by metadata that provides a basis for correspondence between logical device and data request addresses and wherein data transfer requests from other concurrently active applications may continuously be directed to each data set throughout the migration, said program comprising a process for providing in sequence:

A) a first status and operating mode by generating control data structures for each of the source and target logical devices that identify the locations of each of the at least one data set extent in the source logical device and corresponding locations in the target logical device and status information related to the status and operating mode for each extent, data set, and logical device to be migrated, B) a second status and operating mode during which data in each extent undergoing migration is copied asynchronously from the source logical device to the target logical device and is copied concurrently with interactions between any application and any data set in the source logical device undergoing migration, C) a third status and operating mode for each extent in the data set during which the data in the corresponding extents in the source and logical devices are brought into and thereafter maintained in synchronism whereupon the extents in the source and logical devices operate as synchronous mirrors such that any subsequent request to change data from any of the at least one application during the third status and operating mode changes the data in the source extent and the corresponding data in the target extent is updated synchronously, D) a fourth status and operating mode concurrently with the interaction between any application and the data in the any extent undergoing migration, wherein the metadata for each extent in the data set is updated and wherein each data request to any extent from any of the at least one active application is recast to interact in a diverted set with the data only in the corresponding extent in the target logical device and wherein all the extents in a data set are shifted to the diverted state simultaneously, and E) a fifth status and operating mode after all the applications interacting with the data in each data set are migrated during the fourth status and operating mode wherein the migration is terminated, control data structures are removed and operating system catalogs are updated.

18. A data migration application as recited in claim 17 that provides a determination of whether the data set extent is in the one of the second and third operating modes and that processes each data request to the identified data set extent in response to that determination.

19. A data migration application as recited in claim 17 including a determining of whether the extent is in one of the second, third and fourth operating modes and processing of each data request to an extent in the data set in response to said determination.

20. A data migration application as recited in claim 17 including the generation of control blocks that provide the correspondence between extent addresses in the source and target logical devices during the first operating mode.

21. A data migration application as recited in claim 20 wherein each extent includes a plurality of addressed storage locations and the control data structures include information relating to the status of data in each addressed storage location, said application providing an update each time data in an addressed storage location is copied to the target logical device.

22. A data migration application as recited in claim 21 wherein in response to a data request to change data in an extent in the source logical device during the copy state, the application updates the data block status to enable the data to be copied to the target logical device.

23. A data migration application as recited in claim 17 wherein in response to a data request to change data in an extent in the source logical device during the third operating mode, the application generates a request based upon the address correspondence and transfers the data to the corresponding extent in the target logical device.

24. A data migration application as recited in claim 17 wherein in response to the receipt of a data request during the fourth operating mode the application receives the data request, obtains the corresponding target logical device address for the location and generates a new data request with the corresponding location in the target logical device.

* * * * *